United States Patent
Sugimoto et al.

(10) Patent No.: US 6,870,618 B2
(45) Date of Patent: Mar. 22, 2005

(54) WAVELENGTH CHARACTERISTIC MEASURING DEVICE AND METHOD USING LIGHT HAVING WAVELENGTH THEREOF CONTINUOUSLY CHANGED

(75) Inventors: Takashi Sugimoto, Atsugi (JP); Hiroaki Ohtateme, Atsugi (JP)

(73) Assignee: Anritsu Corporation, Tokyo (JP)

( * ) Notice: Subject to any disclaimer, the term of this patent is extended or adjusted under 35 U.S.C. 154(b) by 231 days.

(21) Appl. No.: 10/311,121

(22) PCT Filed: Apr. 26, 2002

(86) PCT No.: PCT/JP02/04202
§ 371 (c)(1),
(2), (4) Date: Dec. 13, 2002

(87) PCT Pub. No.: WO02/088660
PCT Pub. Date: Nov. 7, 2002

(65) Prior Publication Data
US 2003/0142708 A1 Jul. 31, 2003

(30) Foreign Application Priority Data
Apr. 27, 2001 (JP) ........................................ 2001-133357

(51) Int. Cl.[7] ................................................. G01J 3/28
(52) U.S. Cl. ........................ 356/328; 356/308; 356/334
(58) Field of Search ................................ 356/308, 328, 356/334

(56) References Cited

U.S. PATENT DOCUMENTS

| | | | | |
|---|---|---|---|---|
| 6,061,124 A | * | 5/2000 | Nyman et al. | 356/124 |
| 6,069,697 A | * | 5/2000 | Tanimoto et al. | 356/327 |
| 6,334,092 B1 | * | 12/2001 | Hashimoto et al. | 356/328 |
| 6,512,582 B1 | * | 1/2003 | Mori et al. | 356/326 |
| 6,633,380 B1 | * | 10/2003 | Mori et al. | 356/326 |

FOREIGN PATENT DOCUMENTS

| | | | | |
|---|---|---|---|---|
| JP | 59-151026 A | | 8/1984 | |
| JP | 60-91242 A | * | 5/1985 | G01N/21/73 |
| JP | 6-11445 A | | 1/1994 | |
| JP | 2000-164981 A | | 6/2000 | |
| JP | 2000-292260 A | | 10/2000 | |

* cited by examiner

Primary Examiner—F. L. Evans
Assistant Examiner—Kara Geisel
(74) Attorney, Agent, or Firm—Frishauf, Holtz, Goodman & Chick, P.C.

(57) ABSTRACT

A wavelength variable light source emits a light whose wavelengths continuously change from a preset start wavelength up to a stop wavelength to a measuring object. A timing information output section generates timing information showing emission timings of lights emitted from the wavelength variable light source and having start and stop wavelengths and a plurality of wavelengths obtained by delimiting the wavelengths between the start and stop wavelengths in predetermined steps. A light receiving section receives the light output from the measuring object and outputs a signal showing a measured value of a received light. A plurality of amplifiers receive the signal output from the light receiving section and amplify the signal at each predetermined amplification factor. A signal selecting section selects one signal kept in a predetermined measuring range of signals amplified by the plurality of amplifiers at the each predetermined amplification factor and outputs the one signal as a measured value of a light of a wavelength decided in accordance with corresponding timing information in the information output from the timing information output section.

19 Claims, 10 Drawing Sheets

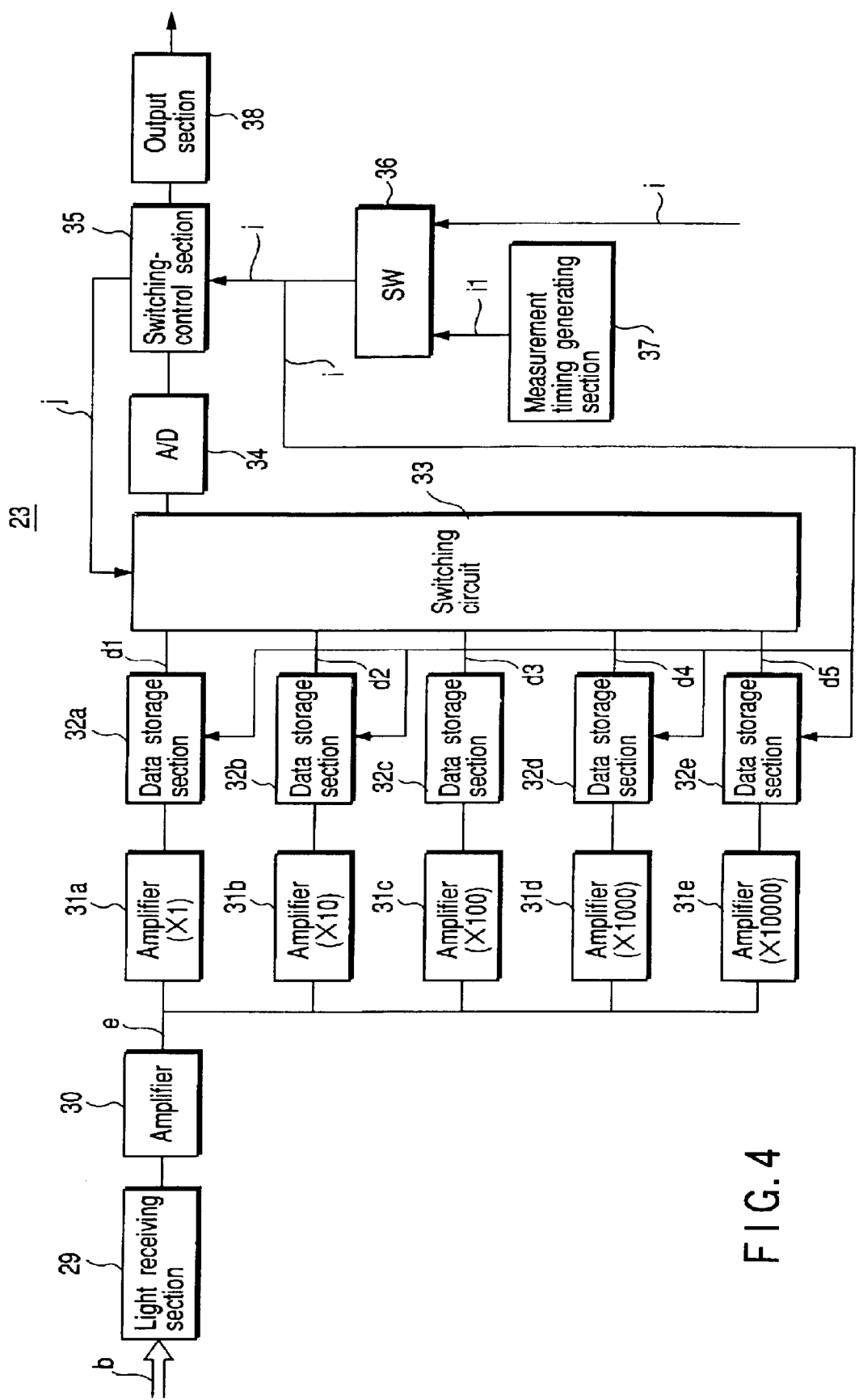
F I G. 4

WAVELENGTH CHARACTERISTIC MEASURING DEVICE AND METHOD USING LIGHT HAVING WAVELENGTH THEREOF CONTINUOUSLY CHANGED

This application is a U.S. National Phase Application under 35 USC 371 of International Application PCT/JP02/04202 filed Apr. 26, 2002.

TECHNICAL FIELD

The present invention relates to a wavelength characteristic measuring apparatus and method, particularly to a wavelength characteristic measuring apparatus and method for measuring a wavelength characteristic to be measured by using a wavelength variable light source, thereby applying a light whose wavelengths continuously change to a measuring object, and measuring intensities of lights having various wavelengths output from the output object.

BACKGROUND ART

A wavelength division multiplexing (WDM) communication method of signal-synthesizing a plurality of light signals having wavelengths different from each other and packing them into a light signal path is recently practically used for an optical communication system in order to efficiently transmit light signals.

Therefore, it is necessary to accurately measure wavelength characteristics of optical members such as an optical fiber, optical amplifier, and optical branching unit serving as measuring objects built in an optical communication system.

FIG. 9 is a block diagram showing a configuration of a conventional wavelength characteristic measuring apparatus for measuring wavelength characteristics of the above optical members.

That is, as shown in FIG. 9, a light "a" comprising a laser beam emitted from a wavelength variable light source 1 inputs a measuring object 2 comprising optical members such as the above-described optical fiber, optical amplifier, and optical branching unit.

Moreover, a light b output from the measuring object 2 enters an optical power meter 3.

The optical power meter 3 measures the light intensity of the input light b and transmits the light intensity to a measurement control section 4 as a measured value c.

FIG. 10 is a block diagram showing a schematic configuration of the wavelength variable light source 1 in FIG. 9.

That is, as shown in FIG. 10, a light a1 having various wavelengths λ distributed in a predetermined wavelength region output from one face of a semiconductor laser 5 enters a diffraction grating 6 and is divided into a plurality of lights having wavelengths different from each other.

A light $a_2$ having a specific wavelength among the lights divided by the diffraction grating 6 is reflected from a reflecting mirror 7 and enters the diffraction grating 6 again.

The reflecting mirror 7 is rotatably supported by a fixed axis 9 through an arm 8.

Moreover, the arm 8 is rotation-controlled by a motor 10.

The motor 10 is rotation-controlled by a motor driving circuit 11.

Therefore, by rotating the motor 10 by the motor driving circuit 11, it is possible to control the attitude angle from the diffraction grating 6 of the reflecting mirror 7 and the distance between the reflecting mirror 7 and the diffraction grating 6.

This makes it possible to guide the light having a designated specific wavelength $\lambda_2$ designated among lights diffracted by the diffraction grating 6 into the diffraction grating 6 again and return the light to the semiconductor laser 5.

Moreover, the distance from the reflecting mirror 7 up to the semiconductor laser 5 through the diffraction grating 6 changes by synchronizing with the above wavelength selecting operation.

Therefore, an external resonator is formed by an optical path from the reflecting mirror 7 up to the semiconductor laser 5 through the diffraction grating 6 and it is possible to extraordinarily increase the intensity of the light having the designated specific wavelength $\lambda_2$ compared to the intensity of light having another wavelength.

That is, the wavelength variable light source 1 makes it possible to optionally control the wavelength λ of the light "a" serving as the light output from the wavelength variable light source 1 output from the other side of the semiconductor laser 5.

In this case, a rotation amount (rotation angle) from a reference position of the motor 10 corresponds to the wavelength λ of the light "a" emitted from the wavelength variable light source 1 one to one.

Therefore, only by designating the wavelength λ to the motor driving circuit 11 from the measurement control section 4, the light "a" having the wavelength λ is output from the wavelength variable light source 1.

FIG. 12 is a flowchart shown to explain a procedure for measuring the wavelength characteristic of the measuring object 2 by the measurement control section 4.

That is, the measurement control section 4 measures the wavelength characteristic of the measuring object 2 in accordance with the flowchart shown in FIG. 12.

First, the measurement control section 4 sets measuring wavelengths $\lambda_1, \lambda_2, \ldots,$ and $\lambda_N$ for the measuring object 2 (step S1).

Then, the measurement control section 4 initializes a measuring wavelength λn (n=1).

The measurement control section 4 designates the measuring wavelength λn to the wavelength variable light source 1 (step S3).

Then, when receiving a notice showing that setting of the measuring wavelength λn is completed from the wavelength variable light source 1 (step S4), the measurement control section 4 transmits a measurement command to the optical power meter 3 (step S5).

When receiving a measured value cn of the wavelength λn from the optical power meter 3 (step S6), the measurement control section 4 processes data for the received measured value cn (step S7).

When measurement of the measured value cn of optical power of one measuring wavelength λn is completed, the measurement control section 4 increments the measuring wavelength λn in step S8 (n=n+1).

Then, the measurement control section 4 returns to step S3 to start measurement of the optical power of the incremented measuring wavelength λn.

Then, when the measuring wavelength λn exceeds the final measuring wavelength $\lambda_N$ in step S9, the measurement control section 4 completes the measuring of the measuring object 2 and edits and outputs the wavelength characteristic shown in FIG. 11.

However, the conventional wavelength-measuring apparatus provided with the configuration and functions shown in FIGS. 9 to 12 has the following problems to be solved yet.

That is, in the case of the wavelength variable light source 1 used for the conventional wavelength characteristic measuring apparatus, the wavelength λ of the emitted light "a" is measured by mechanically moving the position and attitude angle of the reflecting mirror 7 by the motor 10.

Therefore, in this case, it is necessary to confirm that the reflecting mirror 7 is moved to the intended position and attitude angle in accordance with the past record of the rotation angle of the motor 10.

Therefore, the measurement control section 4 must designate and confirm the measuring wavelength λn for the wavelength variable light source 1 by software whenever the measuring wavelength λn is changed.

In this case, accurate position control requires a lot of time due to a phenomenon peculiar to a motor such as backlash.

Moreover, the measurement control section 4 must capture the measurement command and measured value cn for the optical power meter 3 each time.

Thus, in the case of the conventional wavelength characteristic measuring apparatus, it takes a lot of time (e.g. 500 ms/pts) to measure the wavelength characteristic shown in FIG. 11 for one measuring object 2 due to the backlash of the above motor 10 or the like.

Moreover, in the case of the conventional wavelength characteristic measuring apparatus, the optical power meter 3 may be constituted by a light receiving section 12 and a variable amplifier 13 as shown in FIG. 13 in order to improve the measuring accuracy of the light intensity (light power) of the light b emitted from the measuring object 2.

That is, in the case of the conventional wavelength characteristic measuring apparatus, a signal e of the light b converted into an electrical signal output from the light receiving section 12 changes at a very wide level as shown in FIG. 13.

When amplifying the signal e by a normal amplifier having a fixed amplification factor, the linearity of an output is deteriorated because it is difficult to keep the output linearity in a wide input range in the case of the normal amplifier.

The above deterioration of the linearity of the amplifier affects the accuracy of light intensity measurement.

When converting an output of the amplifier for amplifying the signal e into a digital signal by an analog/digital (A/D) converter, the resolution of the converted digital signal is deteriorated if the input range of the A/D converter is increased.

To avoid the above problem, it is necessary to amplify a signal at an amplification factor α corresponding to the level of the signal by using the variable amplifier 13.

Setting of the amplification factor α in the variable amplifier 13 is executed by selecting one of a plurality of feedback circuits respectively constituted by a resistance 15 and a switch 16 which are connected to input and output terminals of an operational amplifier 14 in parallel from the outside.

Therefore, the conventional wavelength characteristic measuring apparatus separately requires a control circuit for detecting an amplified signal value output from the variable amplifier 13 and selecting an optimum feedback circuit so that the amplified signal value becomes an optimum level.

Further, a predetermined time is required by the time the amplification factor α is fixed to a predetermined value after feedback circuits to be connected to the operational amplifier 14 are changed. However, because measurement cannot be executed during the above period, the measuring efficiency is further deteriorated in the case of the conventional wavelength characteristic measuring apparatus.

DISCLOSURE OF INVENTION

It is an object of the present invention to solve the above problems and to provide a wavelength characteristic measuring apparatus and method capable of efficiently measuring the wavelength characteristic of a measuring object while keeping a wide measuring dynamic range by using timing information synchronous with the change of a light emitted from a wavelength variable light source having a function for continuously changing wavelengths of emitted light to a predetermined measuring wavelength and moreover using a plurality of amplifiers.

According to the above wavelength characteristic measuring apparatus and method, a wavelength variable light source for changing wavelengths under the control by a motor can change wavelengths of emitted light at a high speed by continuously changing wavelengths of the emitted light because there is no influence of backlash compared to the case of setting wavelengths of the emitted light one after another. Therefore, it is possible to measure a wavelength characteristic quickly by the reduced time (e.g. about 1 ms/pts of 1/500 at the conventional ratio).

In order achieve the above object, according to a first aspect of the present invention, there is provided a wavelength characteristic measuring apparatus comprising:

a wavelength variable light source (22) which emits a light (a) whose wavelengths continuously change from a preset start wavelength up to a stop wavelength to a measuring object (2);

timing information outputting means (27, 28) for generating a plurality of timing information (i) showing emission timings of lights to be emitted from the wavelength variable light source and having start and stop wavelengths and a plurality of wavelengths obtained by delimiting the wavelengths between the start and stop wavelengths by predetermined steps;

a light receiving section (29) which receives a light (b) output from the measuring object and outputs a signal showing a measured value of a received light;

a plurality of amplifiers (31a, 31b, . . . , 31e, 39b, 39c, . . . , 39e) which receive the signal output from the light receiving section and amplify the signal at each predetermined amplification factor; and a signal selecting section (33, 35) which selects one signal kept in a predetermined measuring range of signals amplified at the each predetermined amplification factor by the plurality of amplifiers and outputs the one signal as the measured value of the light having a wavelength which is decided in accordance with corresponding timing information among the plurality of timing information output from the timing information outputting means.

According to a second aspect of the present invention, there is provided a wavelength characteristic measuring apparatus according to the first aspect, wherein the signal selecting section comprises:

a plurality of data storage sections (32a, 32b, . . . , 32e) which respectively store the signals amplified at each predetermined amplification factor by the plurality of amplifiers in accordance with the plurality of timing information output from the timing information outputting means while the lights having the wavelengths delimited by the predetermined steps are emitted, and a control section (21) which selects the one signal kept in a desired measuring range of the signals (d) stored in the plurality of data storage sections.

According to a third aspect of the present invention, there is provided a wavelength characteristic measuring apparatus according to the first aspect, wherein the timing information outputting means is built in the wavelength variable light source.

According to a fourth aspect of the present invention, there is provided a wavelength characteristic measuring apparatus according to the first aspect, wherein the plurality of amplifiers are connected in parallel and have amplification factors different from each other.

According to a fifth aspect of the present invention, there is provided a wavelength characteristic measuring apparatus according to the first aspect, wherein the plurality of amplifiers are connected in series and have the same amplification factor each other.

In order achieve the above object, according to a sixth aspect of the present invention, there is provided a wavelength characteristic measuring apparatus according to the first aspect, wherein the signal selecting section comprises:

a plurality of data storage sections (32a, 32b, ..., 32e) which store signals amplified at the each predetermined amplification factor by the plurality of amplifiers in accordance with a plurality of timing information output from the timing information outputting means while lights having wavelengths delimited by the predetermined steps are emitted;

a switching circuit (33) which successively switches and outputs signals (d) stored in the plurality of data storage sections; and a switching-control section (35) which switching-controls the switching circuit and selects the one signal kept in a desired measuring range within a data storage period (T) of the plurality of data storage section.

According to a seventh aspect of the present invention, there is provided a wavelength characteristic measuring apparatus according to the sixth aspect, wherein the signal selecting section comprises:

an analog/digital converting section (34) set between the switching circuit and the switching-control section, the analog/digital converting section converting one analog signal in the desired measuring range switching-controlled by the switching circuit into a digital signal; and an output section (38) which outputs the signal in the desired measuring range converted into the digital signal by the analog/digital converting section to an external unit through the switching-control section.

According to an eighth aspect of the present invention, there is provided a wavelength characteristic measuring apparatus according to the first aspect, wherein the wavelength variable light source comprises:

a semiconductor laser (5);

a diffraction grating (6) into which a light ($a_1$) having many wavelengths $\lambda$ distributed in a predetermined wavelength region and output from one face of the semiconductor laser is applied and which diffracts the light into a plurality of lights having wavelengths different from each other;

a reflecting mirror (7) which forms an external resonator with an optical path formed by reflecting a light ($a_2$) having with a specific wavelength among the lights diffracted by the diffraction grating, guides the light having the specific wavelength into the diffraction grating again, and returns the light to the semiconductor laser;

an arm (8) which rotatably supports the reflecting mirror on a fixed shaft (9);

a motor (10) which rotates the arm;

a motor driving circuit (25) which controls the rotation of the motor;

a wavelength control section (24) which writes a start wavelength, a stop wavelength, and N measuring wavelengths $\lambda_1, \lambda_2, \ldots,$ and $\lambda_N$ included in wavelength setting information g in a wavelength memory (26), reading the start and stop wavelengths stored in the wavelength memory when a start command h is input, designating the start and stop wavelengths, and starting the motor driving circuit;

a wavelength detecting circuit (27) which monitors a wavelength $\lambda$ of a light "a" emitted from the wavelength variable light source based on a rotation angle position of the motor; and a timing signal generating section (28) which outputs N pulsatile timing signals while the wavelength $\lambda$ of the light "a" emitted from the wavelength variable light source changes from a start wavelength up to a stop wavelength based on the monitoring result by the wavelength detecting circuit whenever reaching the measuring wavelengths $\lambda_1, \lambda_2, \ldots,$ and $\lambda_N$ stored in the wavelength memory.

In order to achieve the above object, according to a ninth aspect of the present invention, there is provided a wavelength characteristic measuring method comprising:

emitting a light (a) whose wavelengths continuously change from a preset start wavelength up to stop wavelength from a wavelength variable light source to a measuring object (2) by a wavelength variable light source (22);

generating a plurality of timing information (i) showing emission timings of lights emitted from the wavelength variable light source and having start and stop wavelengths and a plurality of wavelengths obtained by delimiting the wavelengths between the start and stop wavelengths in predetermined steps by timing information outputting means (27, 28);

receiving a light (b) output from the measuring object and outputting a signal showing a measured value of a received light by a light receiving section (29);

receiving the signal output from the light receiving section and amplifying the signal at each predetermined amplification factor by a plurality of amplifiers (31a, 31b, ..., 31e, 39b, 39c, ..., 39e); and selecting one signal kept in a predetermined measuring range of signals amplified at the each predetermined amplification factor by the plurality of amplifiers and outputting the one signal as a measured value of the light having a wavelength decided in accordance with corresponding timing information in the plurality of timing information output from the timing information outputting means, by a signal selecting section (33, 35).

According to a tenth aspect of the present invention, there is provided a wavelength characteristic measuring method according to the ninth aspect, wherein signal selection by the signal selecting section (33, 35) comprises:

storing the signals amplified at the each predetermined amplification factor by the plurality of amplifiers in accordance with a plurality of timing information output from the timing information outputting means while lights having wavelengths delimited by the predetermined steps in a plurality of data storage sections (32a, 32b, ..., 32e), and selecting the one signal kept in a desired measuring range of signals (d) stored in the plurality of data storage sections by a control section (21).

According to an eleventh aspect of the present invention, there is provided a wavelength characteristic measuring method according to the ninth aspect, wherein signal selection by the signal selecting section (33, 35) comprises:

storing the signals amplified at the each predetermined amplification factor by the plurality of amplifiers in accordance with a plurality of timing information output from the timing information outputting means while lights having wavelengths delimited by the predetermined steps are emitted in a plurality of data storage sections (32a, 32b, . . . , 32e);

successively switching and outputting signals (d) stored in the plurality of data storage sections by a switching circuit (33); and switching-controlling the switching circuit in a data storage period (T) of the each data storage section and selecting one signal in a desired measuring range by a switching-control section (35).

According to a twelfth aspect of the present invention, there is provided a wavelength characteristic measuring method according to the tenth aspect, further comprising:

outputting one timing signal (i) from the wavelength variable light source (22);

reading a signal value (d) of the one data storage section corresponding to one amplifier finally switching-connected out of the plurality of amplifiers by specifying the switching circuit;

determining that the read signal value is not lower than the measuring range and that the read signal value is not higher than the measuring range, and thereby determining the signal value is present in the measuring range;

dividing the read signal value by an amplification factor α of the amplifier outputting the signal value and converting the division value into a measured value (D) of a corresponding signal (e); and transmitting the converted measured value to the output section as a measured value of the measuring wavelength decided in accordance with the output sequence of timing signals.

According to a thirteenth aspect of the present invention, there is provided a wavelength characteristic measuring method according to the eleventh aspect, further comprising:

when the read signal value is lower than the measuring range, confirming that the amplification factor of the amplifier outputting the signal value is not equal to the maximum amplification factor and transmitting a switching-connecting command to a data storage section corresponding to an amplifier having one-stage-higher amplification factor to the switching circuit;

reading the switched signal value and when the amplification factor of the amplifier outputting the signal value is already equal to the maximum amplification factor, directly adopting the signal value and converting a corresponding signal into a measured value; and transmitting the converted measured value to the output section as a measured value of a corresponding wavelength decided in accordance with the output sequence of timing signals.

According to a fourteenth aspect of the present invention, there is provided a wavelength characteristic measuring method according to the twelfth aspect, further comprising:

when the read signal value is higher than the measuring range, confirming that the amplification factor of the amplifier outputting the signal value is not equal to the minimum amplification factor and transmitting a switching-connecting command to a data storage section corresponding to an amplifier having one-stage-lower amplification factor to the switching circuit;

reading a switched signal value and when the amplification factor of the amplifier outputting the signal value is already equal to the minimum amplification factor, directly adopting the signal value and converting a corresponding signal into a measured value; and transmitting the converted measured value to the output section as a measured value to a corresponding wavelength decided in accordance with the output sequence of timing signals.

In order to achieve the above object, according to a fifteenth aspect of the present invention, there is provided a wavelength characteristic measuring apparatus comprising:

a wavelength variable light source (22) which emits a light (a) whose wavelengths continuously change from a start wavelength up to a stop wavelength to a measuring object (2);

timing information outputting means (27, 28) for generating a plurality of timing information (i) showing emission timings of lights emitted from the wavelength variable light source and having start and stop wavelengths and a plurality of wavelengths obtained by delimiting the wavelengths between the start and stop wavelengths in predetermined steps;

a light receiving section (29) which receives a light (b) emitted from the measuring object and outputs a signal showing a measured value of the received light;

a plurality of amplifiers (40b, 40c, . . . , 40e) which receive signals from the light receiving section and amplify the signals at each predetermined amplification factor;

a plurality of comparators (41a, 41b, . . . , 41e) which compares the signals amplified at each predetermined amplification factor by the plurality of amplifiers in accordance with an upper limit value and a lower limit value of a measuring range corresponding to each preset amplifier, and thereby outputting a switching signal showing connection when the signal output from the each amplifier is kept between the upper limit value and the lower limit value and outputting a switching signal showing non-connection when the signal output from the each amplifier is not kept between the upper limit value and the lower limit value;

a data storing/switching circuit section (33) which stores signals output from a corresponding amplifier among a plurality of amplifiers decided based on switching signals output from the plurality of comparators in accordance with a plurality of timing information output from the timing information outputting means while the light having wavelengths delimited by the predetermined steps is emitted; and a control section (35) which selects a signal output from a corresponding amplifier out of a plurality of amplifiers decided in accordance with the switching signals among the signals (d) stored in the data storing/switching circuit section as one signal in a desired measuring range based on the switching signal from the plurality of comparators.

According to a sixteenth aspect of the present invention, there is provided a wavelength characteristic measuring apparatus according to the fifteenth aspect, wherein the timing information outputting means is built in the wavelength variable light source.

According to a seventeenth aspect of the present invention, there is provided a wavelength characteristic measuring apparatus according to the fifteenth aspect, further comprising:

an analog/digital converting section (34) set between the data storing/switching circuit section and the control section, the analog/digital converting section converting one analog signal in the desired measuring range switching-controlled by the data storing/switching circuit section into a digital signal; and an output section (38) which outputs one signal converted into a digital signal by the analog/digital converting section and in the desired measuring range to an external unit through the control section.

According to an eighteenth aspect of the present invention, there is provided a wavelength characteristic measuring apparatus according to the fifteenth aspect, wherein the wavelength variable light source comprises:

a semiconductor laser (5);

a diffraction grating (6) in which a light ($a_1$) having many wavelengths λ distributed in a predetermined wavelength region output from one face of the semiconductor laser enters and which divides the light into a plurality of lights having wavelengths different from each other;

a reflecting mirror (7) which reflects a light ($a_2$) having a specific wavelength among the lights divided by the diffraction grating, guides the light into the diffraction grating again, and returns the light to the semiconductor laser, and thereby forming an external resonator in accordance with the optical path;

an arm (8) which rotatably supports the reflecting mirror on a fixed shaft (9);

a motor (10) which rotates the arm;

a motor driving circuit (25) which controls the rotation of the motor;

a wavelength control section (24) which writes a start wavelength and a stop wavelength and N measuring wavelengths $\lambda_1, \lambda_2, \ldots$, and $\lambda_N$ included in wavelength setting information g in a wavelength memory (26) and when a start command h is input, reading the start wavelength and stop wavelength stored in the wavelength memory, designating the start wavelength and stop wavelength, and starting the motor driving circuit;

a wavelength detecting circuit (27) which monitors a wavelength λ of a light "a" emitted from the wavelength variable light source in accordance with a rotation angle position of the motor; and a timing signal generating section (28) which outputs N pulsatile timing signals while the wavelength λ of the light "a" emitted from the wavelength variable light source changes from a start wavelength to a stop wavelength in accordance with a monitoring result by the wavelength detecting circuit whenever reaching the measuring wavelengths $\lambda_1, \lambda_2, \ldots$, and $\lambda_N$ stored in the wavelength memory.

In order to achieve the above object, according to a nineteenth aspect of the present invention, there is provided a wavelength characteristic measuring method comprising:

emitting a light (a) whose wavelengths continuously change from a preset start wavelength up to a stop wavelength from a wavelength variable light source to a measuring object (2) by a wavelength variable light source (22);

generating a plurality of timing information (i) showing emission timings of lights emitted from the wavelength variable light source and having start and stop wavelengths and a plurality of wavelengths obtained by delimitating the wavelengths between the start and stop wavelengths in predetermined steps by timing information outputting means (27, 28);

receiving a light (b) emitted from the measuring object and outputting a signal showing a measured value of the received light by a light receiving section (29);

receiving signals output from the light receiving section and amplifying the signals at each predetermined amplification factor by a plurality of amplifiers (40a, 40b, ..., 40e);

comparing the signals amplified by the amplifiers at each predetermined amplification factor in accordance with an upper limit value and a lower limit value in a desired measuring range corresponding to each preset amplifier by the comparators and thereby, outputting a switching signal showing connection when a signal output from the each amplifier is kept between the upper limit value and the lower limit value and outputting a switching signal showing no-connection when the signal output from the each amplifier is not kept between the upper limit value and the lower limit value by a plurality of comparators (41a, 41b, ..., 41e);

storing signals output from a corresponding amplifier among a plurality of amplifiers decided in accordance with switching signals output from the plurality of comparators in accordance with a plurality of timing information output from the timing information outputting means while the light having wavelengths delimited by the predetermined steps by a data storing/switching circuit (33); and selecting a signal output from a corresponding amplifier among a plurality of amplifiers decided in accordance with the switching signals among the signals (d) stored in the data storing/switching circuit section as one signal in a desired measuring range based on the switching signal from the plurality of comparators by a control section (35).

In the case of the wavelength characteristic measuring apparatus having the above configuration and functions, the light whose wavelengths continuously change is emitted from the wavelength variable light source.

Further, timing information showing the change time to each measuring wavelength of the light emitted from the wavelength variable light source is output from the timing information outputting means.

Therefore, the measurement control section does not have to transmit the control signal for changing measuring wavelengths to the wavelength variable light source each time.

Moreover, a plurality of amplifiers for respectively amplifying a signal corresponding to the intensity of the light output from the light receiving section are set.

Signals output from the amplifiers are amplified at amplification factors different from each other as a result.

Therefore, because a plurality of signals amplified at different amplification factors can be obtained at the same time, it is unnecessary to change amplification factors α in order like the case of a conventional apparatus. Thus, it is possible to improve a measurement efficiency.

Because each amplified signal is stored in the data storage section from the change time to one measuring wavelength up to the change time to the next measuring wavelength, a signal having an optimum amplification factor is selected in the storage period and transmitted to the measurement control section.

Accordingly, because the measurement control section does not have to designate each measuring wavelength or output a measurement designation for a signal to each measuring wavelength, it is possible to improve the measurement efficiency of wavelength characteristics of all measuring objects of the wavelength characteristic measuring apparatus.

In another mode, timing information outputting means is built in a wavelength variable light source.

Thereby, the wavelength variable light source outputs the light whose wavelengths continuously change and outputs timing information every change to a preset measuring wavelength.

In the present invention, the data storage section is set to avoid that wavelengths of the light emitted from the wavelength variable light source are changed by the time the change control section or control section actually obtains measured data through the A/D converter after it obtains a timing signal since the wavelength variable light source continuously changes the wavelength of the emitted light.

Therefore, when the above processing is executed by the switching-control section or control section within the time in which wavelengths of the light emitted from the wavelength variable light source are not changed, the data storage section is unnecessary.

BRIEF DESCRIPTION OF DRAWINGS

FIG. 4 is a block diagram showing a schematic configuration of an optical power meter built in the wavelength characteristic measuring apparatus according to the first embodiment of the present invention.

BEST MODE FOR THE CARRYING OUT OF THE INVENTION

Embodiments of the present invention are described below by referring to the accompanying drawings.

(First Embodiment)

Figure 1:
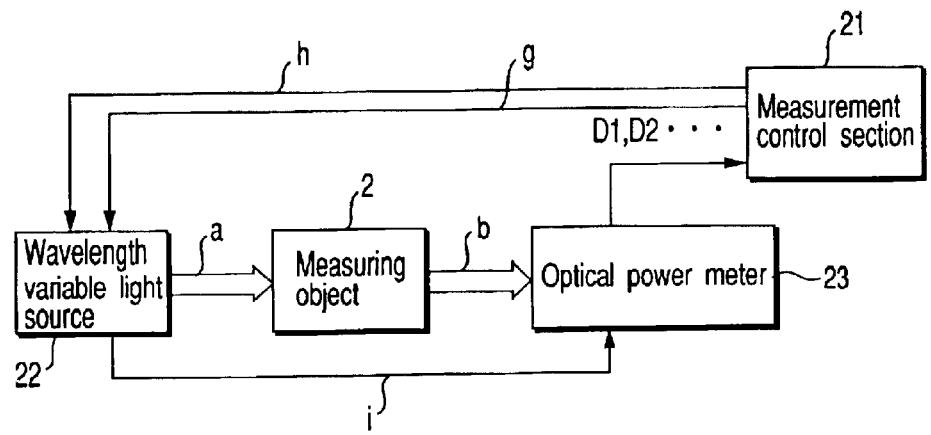
FIG. 1 is a block diagram sowing a schematic configuration of a wavelength characteristic measuring apparatus according to a first embodiment of the present invention.

FIG. 1 is a block diagram showing a schematic configuration of a wavelength characteristic measuring apparatus.

Figure 2:
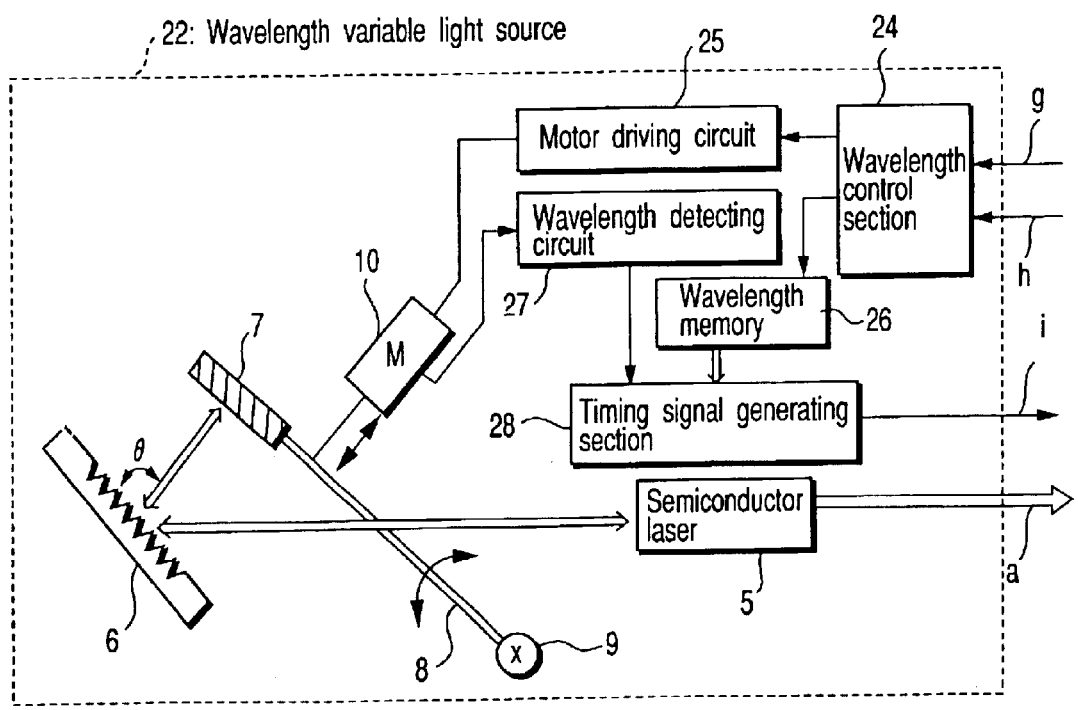
FIG. 2 is a schematic diagram showing a schematic configuration of a wavelength variable light source built in the wavelength characteristic measuring apparatus according to the first embodiment of the present invention.

FIG. 2 is a block diagram showing a schematic configuration of a wavelength variable light source built in the wavelength characteristic measuring apparatus in FIG. 1.

Figure 8:
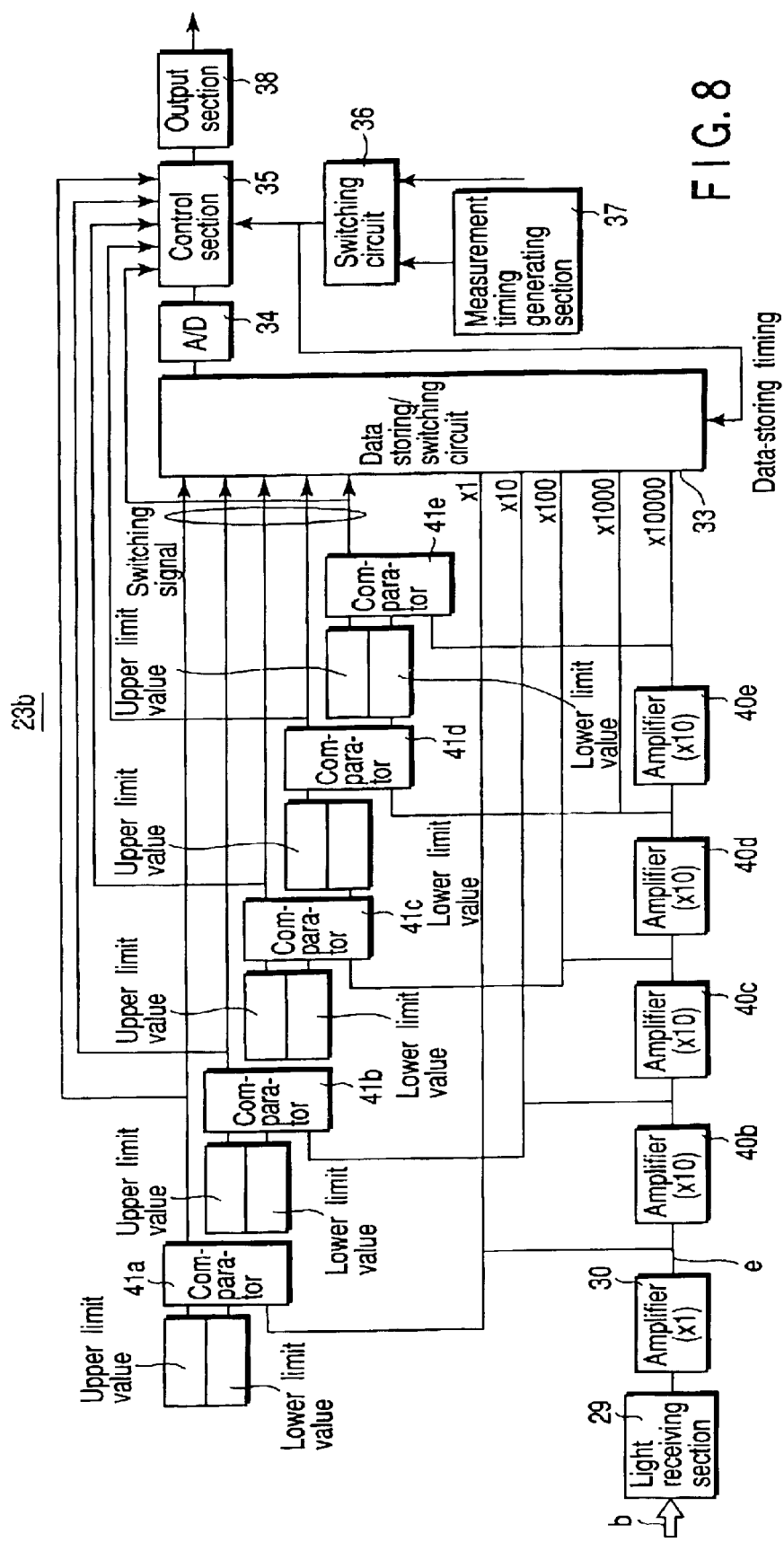
FIG. 8 is a block diagram showing a schematic configuration of an optical power meter built in a wavelength characteristic measuring apparatus according to a third embodiment of the present invention.
Figure 9:
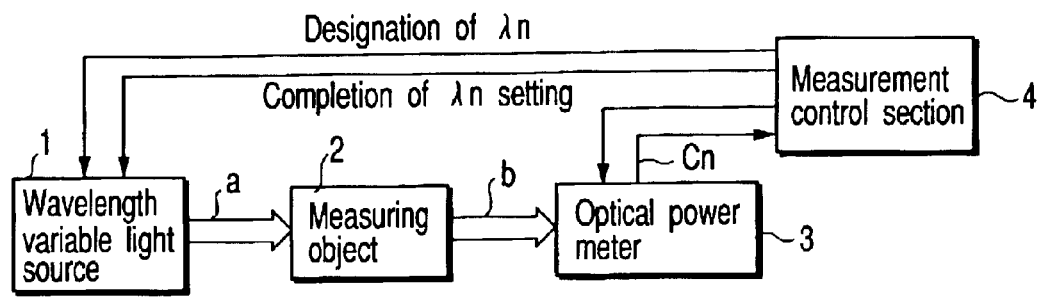
FIG. 9 is a block diagram showing a schematic configuration of a conventional wavelength characteristic measuring apparatus.

In FIGS. 1 and 2, portions same as those of the conventional wavelength characteristic measuring apparatus and wavelength variable light source shown in FIGS. 8 and 9 are provided with the same symbol and detailed description of duplicate portions is omitted.

That is, as shown in FIG. 1, in the wavelength characteristic measuring apparatus according to the first embodiment of the present invention, a measurement control section 21 comprising an information processor such as a computer transmits to a wavelength variable light source 22 information g in which a start wavelength, stop wavelength, and wavelength comprising N measuring wavelengths $\lambda_1, \lambda_2, \lambda_3, \ldots,$ and $\lambda_N$ when dividing the portion between the start wavelength and the stop wavelength into (N−1) steps coincide with each other and a start command h.

Then, a light "a" whose wavelengths $\lambda$ continuously change emitted from a wavelength variable light source 22 enters a measuring object 2.

A light b output from the measuring object 2 enters an optical power meter 23.

Moreover, a pulsatile timing signal i is transmitted to the optical power meter 23 together with the light "a" as the timing information showing change times whenever the wavelength $\lambda$ of the light "a" changes to (reaches) the measuring wavelengths $\lambda_1, \lambda_2, \lambda_3, \ldots,$ and $\lambda_N$.

The optical power meter 23 measures the intensity of the input light b and transmits measured values $D_1, D_2, D_3, \ldots,$ and $D_N$ corresponding to the input measuring wavelengths $\lambda_1, \lambda_2, \lambda_3, \ldots,$ and $\lambda_N$ to the measurement control section 21.

Figure 11:
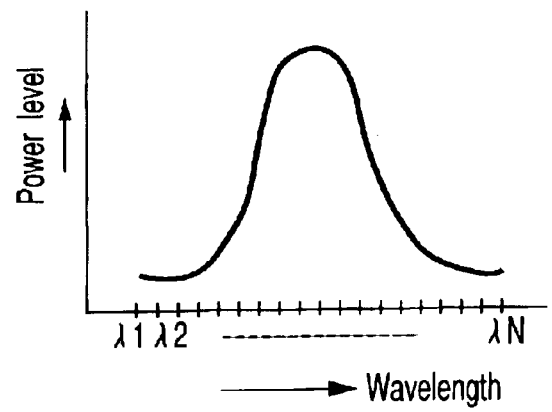
FIG. 11 is an illustration showing the wavelength characteristic of a measuring object measured by the conventional wavelength characteristic measuring apparatus shown in FIG. 9.
Figure 12:
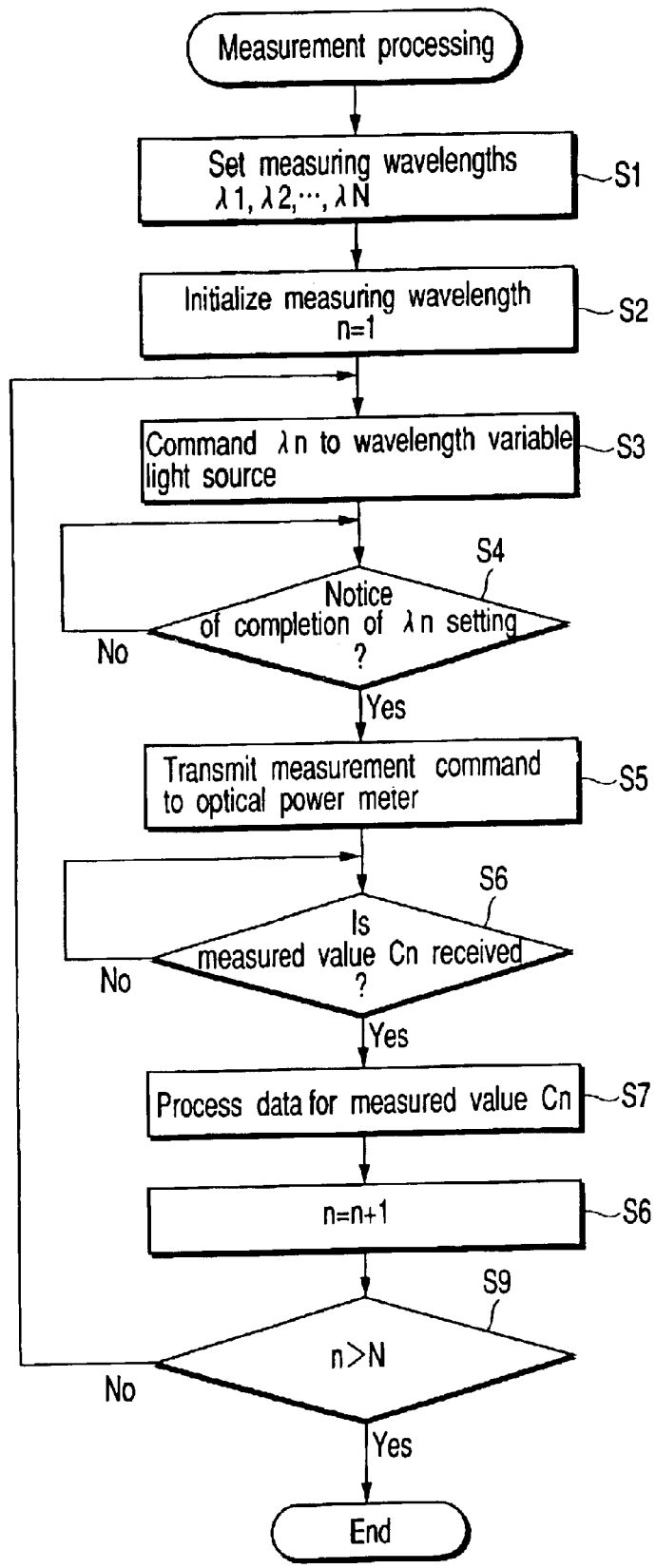
FIG. 12 is a flowchart shown to explain the measuring operation of a measurement control section built in the conventional wavelength characteristic measuring apparatus shown in FIG. 9.
Figure 13:
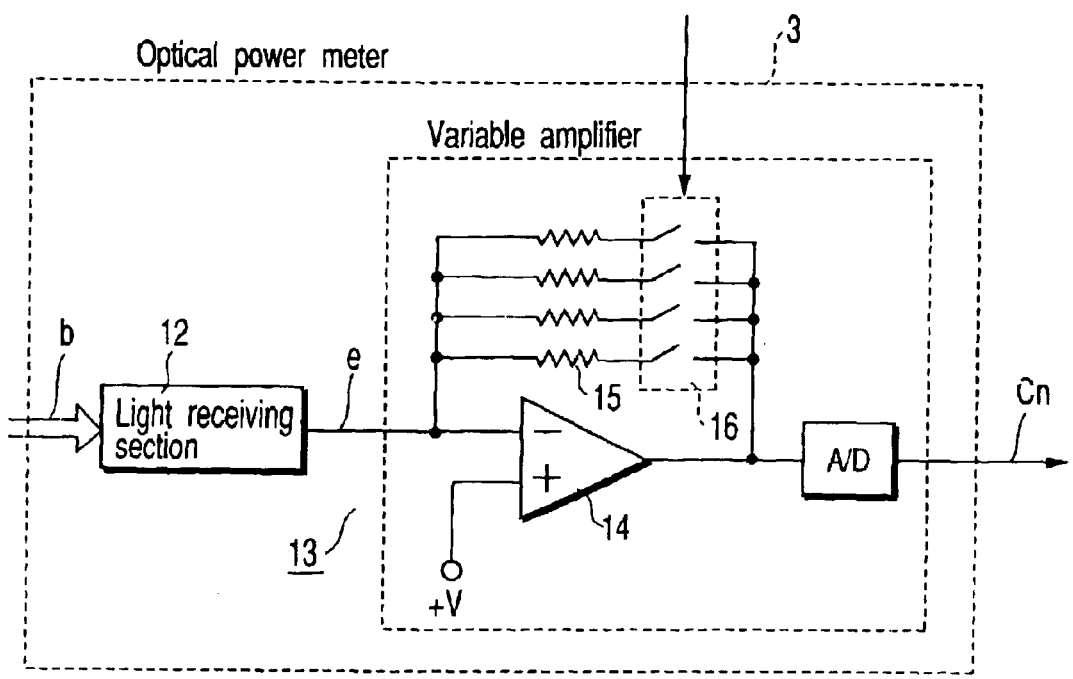
FIG. 13 is an illustration showing a configuration of a variable amplifier built in an optical power meter of another conventional wavelength characteristic measuring apparatus.

The measurement control section 21 rearranges the measured values $D_1, D_2, D_3, \ldots,$ and $D_N$ corresponding to the input measuring wavelengths $\lambda_1, \lambda_2, \lambda_3, \ldots,$ and $\lambda_N$, and edits and outputs the wavelength characteristic shown in FIG. 11 of the measuring object 2.

Next, details of the above portions are described in order.

FIG. 2 is an illustration showing a schematic configuration of the wavelength variable light source 22.

Figure 10:
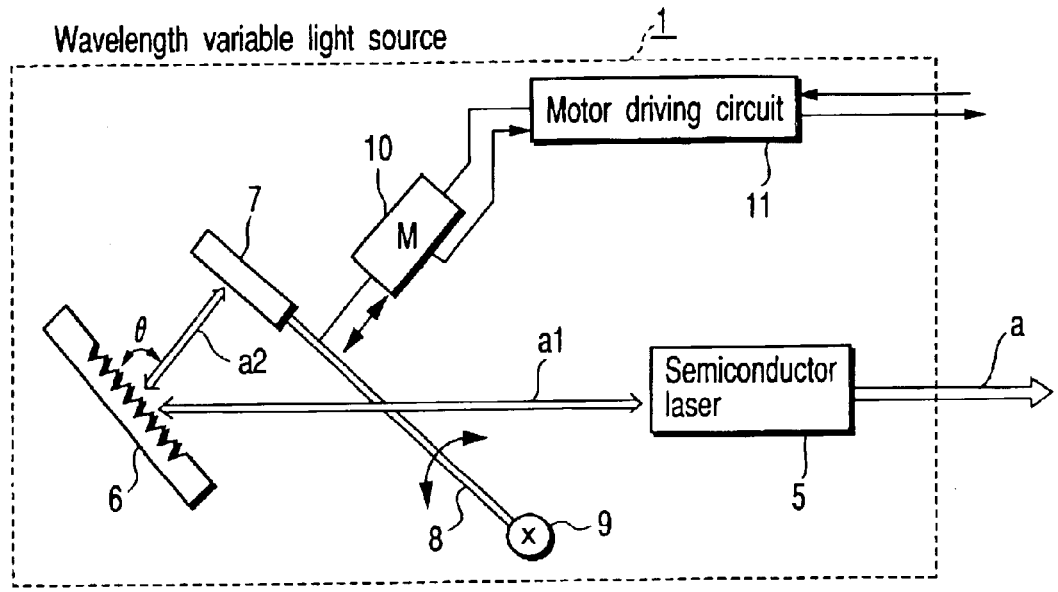
FIG. 10 is a schematic view showing a schematic configuration of a wavelength variable light source built in the conventional wavelength characteristic measuring apparatus shown in FIG. 9.

In FIG. 2, the operation principle that the light "a" having an optional wavelength $\lambda$ is output from the wavelength variable light source 22 by using a semiconductor laser 5, a diffraction grating 6, a reflecting mirror 7, and a motor 10 is the same as the conventional wavelength variable light source 1 shown in FIG. 10. Therefore, description of the components is omitted.

A wavelength control section 24, a motor driving circuit 25, a wavelength memory 26, a wavelength detecting circuit 27, and a timing signal generating section 28 are provided in the wavelength variable light source 22.

Moreover, the wavelength variable light source 22 writes a start wavelength, a stop wavelength, and N measuring wavelengths $\lambda_1, \lambda_2, \lambda_3, \ldots,$ and $\lambda_N$ included in the information g whose wavelengths received from the measurement control section 21 coincide with each other in the wavelength memory 26.

In addition, when a start command h is input from the measurement control section 21, the wavelength variable light source 24 reads the start wavelength and stop wavelength from the wavelength memory 26 and designates the read start and stop wavelengths to start the motor driving circuit 25.

The motor driving circuit 25 continuously rotates the motor 10 from the rotation angle position corresponding to the start wavelength up to the rotation angle position corresponding to the stop wavelength.

In this way, the wavelength variable light source 22 emits the light "a" whose wavelengths λ continuously change from a start wavelength up to stop wavelength.

As described above, the rotation angle position of the motor 10 corresponds to the wavelength λ of the emitted light "a" one to one.

Moreover, the wavelength detecting circuit 27 monitors the wavelength λ of the light "a" emitted from the rotation angle position of the motor 10 and transmits it to the timing signal generating section 28.

The timing signal generating section 28 outputs the pulsatile timing signal 1 whenever the wavelength λ of the light "a" reaches the measuring wavelengths $\lambda_1, \lambda_2, \lambda_3, \ldots$, and $\lambda_N$ stored in the wavelength memory 26.

Figure 3:
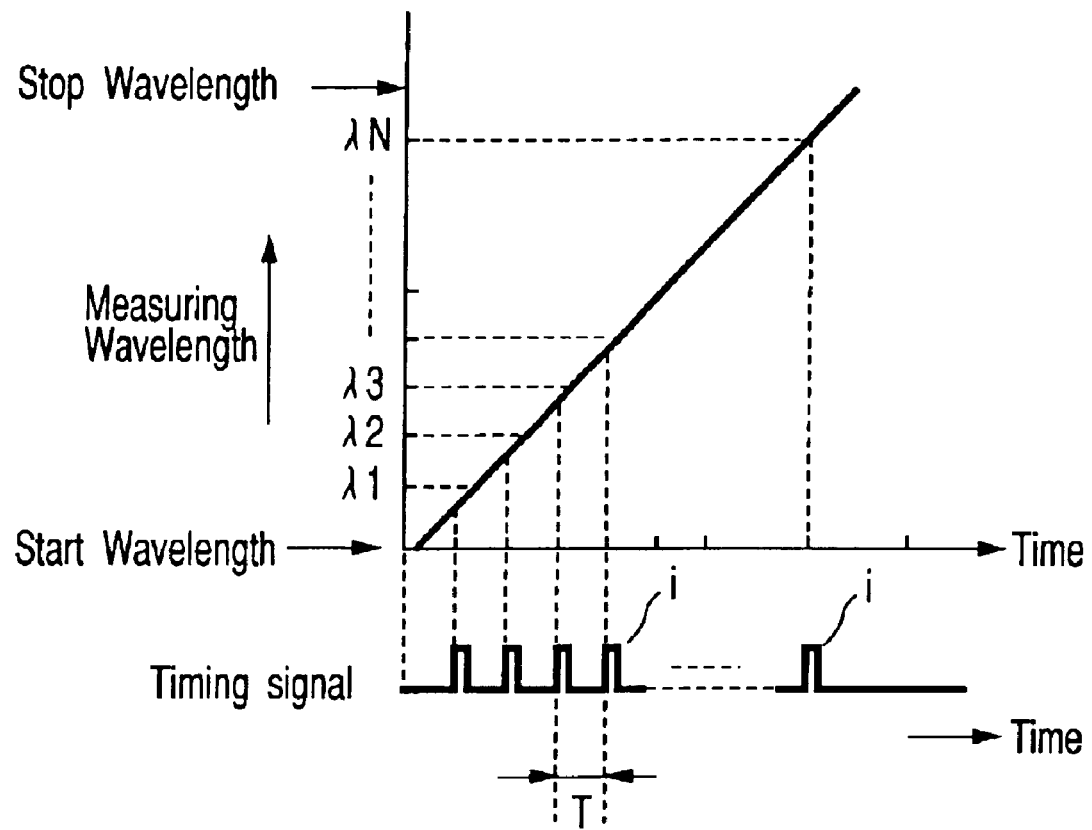
FIG. 3 is a characteristic diagram showing the relation between each measuring wavelength of a light output from the wavelength variable light source in FIG. 2 and a timing signal.

Therefore, as shown in FIG. 3, while the wavelength λ of the light "a" emitted from the wavelength variable light source 22 changes from the start wavelength up to the stop wavelength, N timing signals i are output from the timing signal generating section 28.

Then, the interval (time) T between the timing signals i output from the timing signal generating section 28 is decided in accordance with the rotational speed of the motor 10 and the number of measuring wavelengths N.

FIG. 4 is a block diagram showing a schematic configuration of the optical power meter 23.

That is, as shown in FIG. 4, the light b emitted from the measuring object 2 enters the light receiving section 29 in the optical power meter 23 and thereby, it is converted into an electrical signal corresponding to light intensity.

The electrical signal is amplified up to a predetermined level by a preamplifier 30 and then input, as a new single e, to parallel-connected amplifiers 31a to 31e.

Amplification factors α of the amplifiers 31a, 31b, 31c, 31d, and 31e are set to 1, 10, 100, 1,000, and 10,000 respectively.

The amplifiers 31a, 31b, 31c, 31d, and 31e amplify the signal e input at the amplification factors α set to them respectively and transmit the signal e to data storage sections 32a, 32b, 32c, 32d, and 32e connected to them.

The timing signals i input from the wavelength variable light source 22 are applied to the switching-control section 35 and data storage section 32a, 32b, 32c, 32d, and 32e through a changeover switch 36.

A measurement-timing-generating section 37 outputs a measurement-timing signal $i_1$ when a measurer designates an optional wavelength and manually executes measurement.

Therefore, in the case of normal automatic measurement, the changeover switch 36 is set to the side of the timing signal i input from the wavelength variable light source 22.

The data storage sections 32a, 32b, 32c, 32d, and 32e capture the signal values $d_1, d_2, d_3, d_4$, and $d_5$ of amplified signals applied from the amplifiers 31a, 31b, 31c, 31d, and 31e and store them until the next timing signal i is input.

As shown in FIG. 3, because the time interval between the timing signals i is equal to T, the signal values $d_1, d_2, d_3, d_4$, and $d_5$ are stored for the time T.

The signal values $d_1, d_2, d_3, d_4$, and $d_5$ stored for the time T in the data storage sections 32a, 32b, 32c, 32d, and 32e are input to a switching circuit 33.

The switching circuit 33 switching-connects one of the data storage sections 32a, 32b, 32c, 32d, and 32e designated by a switching signal j output from a switching-control section 35 to an A/D converter 34.

Therefore, only the signal value $d_1, d_2, d_3, d_4$, or $d_5$ of one of the data storage sections 32a, 32b, 32c, 32d, and 32e switching-connected in the switching circuit 33 is converted from an analog signal to a digital signal by the (A/D) converter 34 and transmitted to the switching-control section 35.

The switching-control section 35 selects an optimum signal value in a desired measuring range among the signal values $d_1, d_2, d_3, d_4$, and $d_5$, converts the selected signal value at the amplification factor α of an amplifier outputting the selected signal and transits the signal value to the measurement control section 21 through an output section 38 as measured values $D_1, D_2, D_3, \ldots$, and $D_N$ corresponding to the measuring wavelengths $\lambda_1, \lambda_2, \lambda_3, \ldots$, and $\lambda_N$.

Thus, the switching circuit 33 and switching-control section 35 constitute a signal selecting section.

In this case, relations between the level of the signal e amplified output from the preamplifier 30 and the amplifiers 31a, 31b, 31c, 31d, and 31e to be adopted are described below by referring to FIGS. 5A to 5D.

Figure 5A:
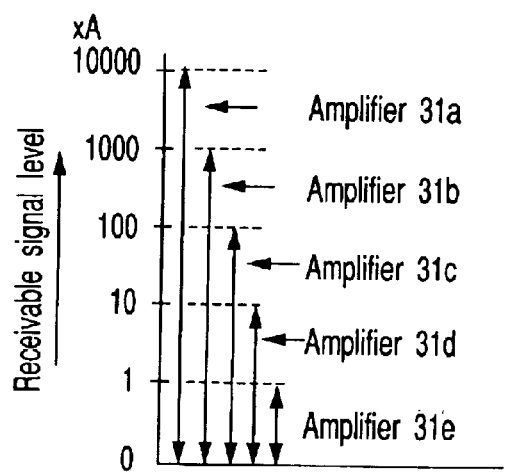
FIGS. 5A to 5D are illustrations showing relations between amplification factors of amplifiers built in the optical power meter in FIG. 4 and receivable signal levels.

FIG. 5A is an illustration showing receivable signal levels of the amplifiers 31a, 31b, 31c, 31d, and 31e.

Signals e which can be input to the amplifiers 31a, 31b, 31c, 31d, and 31e have maximum values of signal levels different from each other.

For example, the amplifier 31a having the amplification factor α of 1 can input up to a signal level 10,000 times higher than a reference level A.

In contrast, the amplifier 31e having the amplification factor α of 10,000 can input only a signal level equal to the reference level A.

Moreover, the amplifier 31b having the amplification factor α of 10 can input up to a signal level 1,000 times higher than the reference level A.

When the level of the signal e input to each amplifier is excessively close to the upper limit or lower limit in the level range that can be input by the amplifier, the number of errors included in an amplification result may be increased.

Figure 5B:
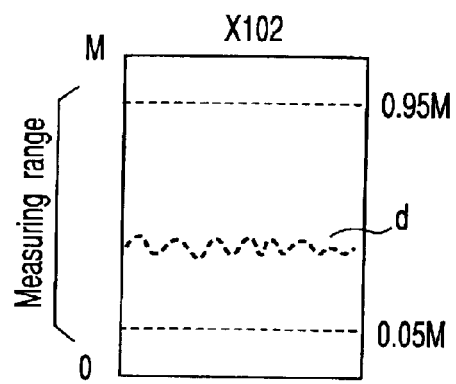

Accordingly, as shown in FIG. 5B, the range between upper limit 0.95 M and lower limit 0.05M to the maximum value M of outputs of the amplifiers 31a, 31b, 31c, 31d, and 31e having amplification factors α different from each other is defined as a measuring range.

Figure 5C:
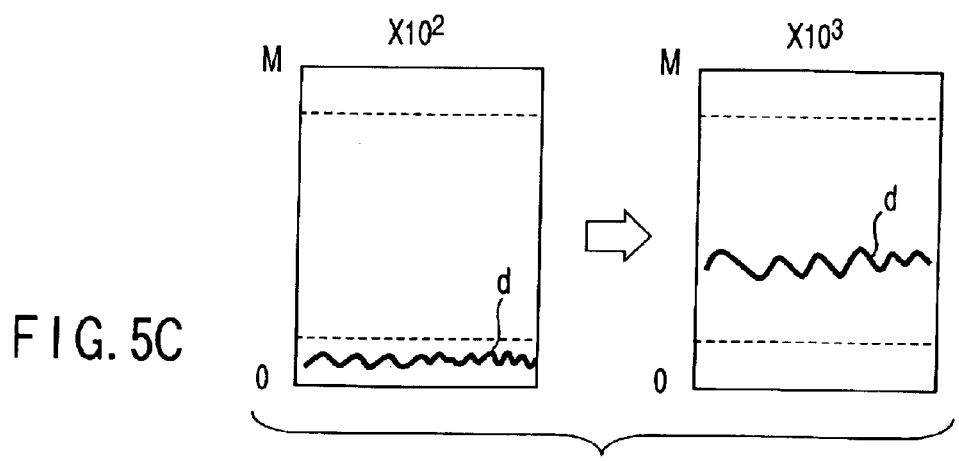

As shown in FIG. 5C, when an amplified signal value d is lower than the measuring range, a signal value d amplified by an amplifier having one-stage-higher amplification factor α is adopted.

Figure 5D:
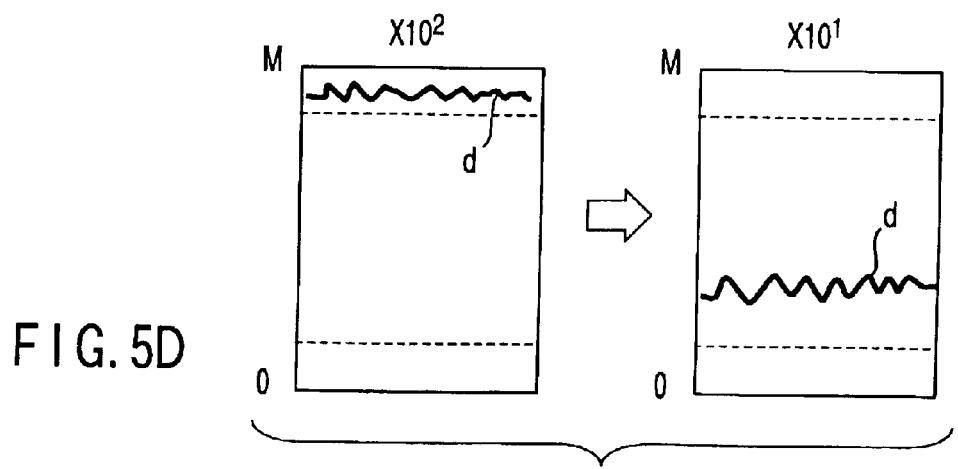

As shown in FIG. 5D, conversely, when the amplified signal value d is higher than the measuring range, a signal value amplified by an amplifier having one-stage-lower amplification factor α is adopted.

Figure 6:
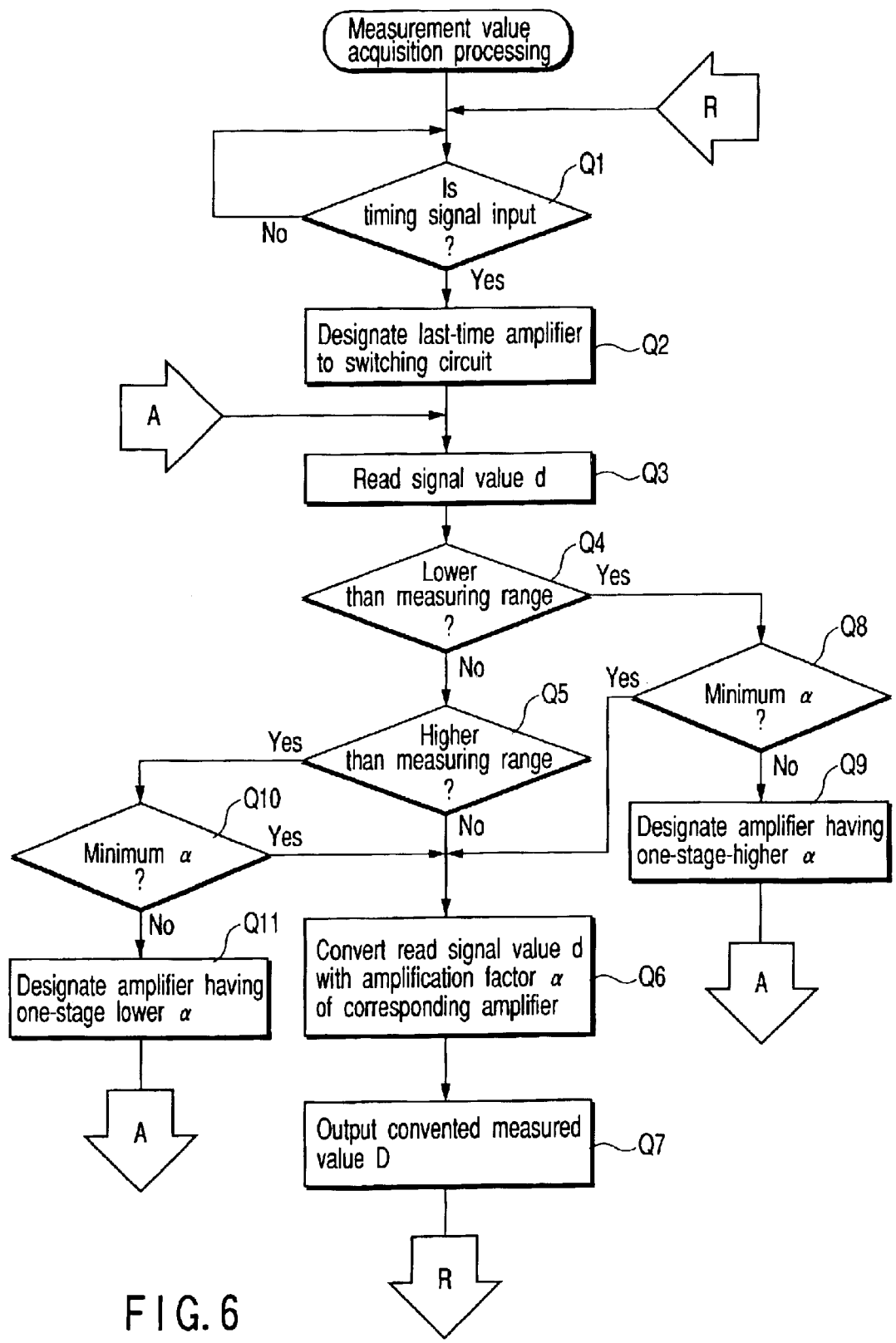
FIG. 6 is a flowchart shown to explain operations of the optical power meter in FIG. 4.

Then, the switching-control section 35 executes measured-value fetching in accordance with the flowchart shown in FIG. 6.

First, when one timing signal i is input from the wavelength variable light source 22 (step Q1), the switching-control section 35 designates one of the data storage sections 32a, 32b, $\ldots$, and 32e of the amplifiers 31a, 31b, $\ldots$, and 31e finally connected at the last time to the switching circuit 33 (step Q2).

Next, the switching-control section 35 reads the signal value d of one of the switching-connected data storage sections 32a, 32b, $\ldots$, and 32e (step Q3).

When the read signal value d is not lower than the above measuring range (step Q4) and higher than the measuring range (step Q5), the switching-control section 35 determines that the signal value d is present in the measuring range.

In this case, the switching-control section 35 divides the read signal value d by the amplification factor α of one of the amplifiers 31a, 31b, . . . , and 31e outputting the signal value d to convert the signal value d into a measured value D of the signal e (step Q6).

Moreover, the switching-control section 35 transmits the converted measured value D to the measurement control section 21 through the output section 38 as the measured value D of the measuring wavelength λ decided in accordance with the output sequence of the timing signal i (step Q7).

Because fetching of the measured value D of the timing signal i input this time is completed, the switching-control section 35 returns to step Q1 to wait until the next timing signal i is input.

Moreover, when the read signal value d is lower than the above measuring range in step Q4 as shown in FIG. 5C, the switching-control section 35 confirms that the amplification factors α of one of the amplifiers 31a to 31e outputting the signal value d is not the maximum amplification factor (step Q8) and transmits a switching-connecting command for the data storage sections 32a, 32b, . . . , and 32e corresponding to the amplifiers 31a, 31b, . . . , and 31e having one-stage-higher amplification factor α to the switching circuit 33 (step Q9).

Thereafter, the switching-control section 35 returns to step Q3 to read the switched signal value d.

When the amplification factor α of one of the amplifiers 31a, 31b, . . . , and 31e outputting the signal value d reaches the maximum amplification factor (step Q8), the switching-control section 35 directly adopts the signal value d because the amplification factor α cannot be raised any more.

Then, the switching-control section 35 starts the processing in step Q6 to convert the signal e into the measured value D (step Q6).

When the signal value D read in step Q5 is higher than the above measuring range as shown in FIG. 5D, the switching-control section 35 confirms that the amplification factor α of one of the amplifiers 31a, 31b, . . . , and 31e outputting the signal value d is not the minimum amplification factor (step Q10) and transmits a switching-connecting command for the data storage sections 32a, 32b, . . . , and 32e corresponding to the amplifiers 31a, 31b, . . . , and 31e having one-stage-lower amplification factor α to the switching circuit 33 (step Q11).

Thereafter, the switching-control section 35 restarts the processing in step Q3 to read the switched signal value d.

Moreover, the switching-control section 35 directly adopts the signal value d because the amplification factor α cannot be lowered any more when the amplification factor α of one of the amplifiers 31a, 31b, . . . , and 31e outputting the signal value d reaches the minimum amplification factor.

The switching-control section 35 starts the processing in step Q6 to convert the signal e into the measured value D (step Q6).

Moreover, after the one-time timing signal i shown in FIG. 6 is input, fetching of the measured value D of the measuring wavelength λ is completed with a sufficient margin within the time T in which the next timing signal i is input.

Thus, the optical power meter 23 shown in FIG. 4 transmits measured values $D_1$, $D_2$, $D_3$, . . . , and $D_N$ of measuring wavelengths $λ_1$, $λ_2$, . . . , and $λ_N$ to the measurement control section 21 synchronously with input of the timing signal i from the wavelength variable light source 22.

Because the measurement control section 21 obtains the measuring wavelengths $λ_1$, $λ_2$, $λ_3$, . . . , and $λ_N$ set to the wavelength variable light source 22 by the measurement control section 21, it rearranges the data for the measured values $D_1$, $D_2$, $D_3$, . . . , and $D_N$ corresponding to the measuring wavelengths $λ_1$, $λ_2$, $λ_3$, . . . , and $λ_N$ and edits and outputs the wavelength characteristic shown in FIG. 11.

In the case of the wavelength characteristic measuring apparatus of the first embodiment thus constituted, the measurement control section 21 sets the information q coinciding with wavelengths comprising a start wavelength, stop wavelength, and N measuring wavelengths $λ_1$, $λ_2$, $λ_3$, . . . , and $λ_N$ to the wavelength variable light source 22.

Thereafter, the start command h is transmitted to the wavelength variable light source 22 from the measurement control section 21.

As a result, the light "a" whose wavelengths λ continuously change from a start wavelength up to stop wavelength is automatically emitted from the wavelength variable light source 22 and enters the measuring object 2.

Accordingly, the measurement control section 21 does not have to transmit a control signal for changing measuring wavelengths $λ_1$, $λ_2$, $λ_3$, . . . , and $λ_N$ to the wavelength variable light source 22 each time.

Thus, the wavelength characteristic measuring apparatus of the first embodiment can greatly improve the measuring efficiency of the measurement control section 21.

Moreover, in the case of the optical power meter 23, signals e corresponding to the light intensity output from the light receiving section 29 and amplified by the preamplifier 30 are simultaneously amplified by the amplifiers 31a, 31b, 31c, 31d, and 31e having amplification factors α different from each other and connected in parallel.

Then, one of the signal values $d_1$, $d_2$, $d_3$, $d_4$, and $d_5$ kept in the measuring range shown in FIGS. 5A to 5D is selected out of the signal values $d_1$, $d_2$, $d_3$, $d_4$, and $d_5$ to obtain the measured value D of the measuring wavelength λ.

Therefore, the wavelength characteristic measuring apparatus of the first embodiment makes it possible to improve the measurement efficiency because the signal values $d_1$, $d_2$, $d_3$, $d_4$, and $d_5$ amplified at different amplification factors α can be simultaneously obtained and thereby it is unnecessary to change amplification factors α in order like the case of a conventional apparatus.

Because the signal e corresponding to the light intensity output from the light receiving section 29 is resultantly amplified at an optimum amplification factor α, the wavelength characteristic measuring apparatus of the first embodiment can improve the measuring accuracy of the measured values $D_1$, $D_2$, $D_3$, . . . , and $D_N$ of the measuring wavelengths $λ_1$, $λ_2$, $λ_3$, . . . , and $λ_N$.

Moreover, the signal values $d_1$, $d_2$, $d_3$, $d_4$, and $d_5$ are stored in the data storage sections 32a, 32b, . . . , and 32e respectively from one timing signal i capable of specifying the measuring wavelength λ up to the next timing signal i. Within the time T, the signal value d of the optimum amplification factor α is selected to obtain the measured value D and transmit the value D to the measurement control section 21.

Thus, the wavelength characteristic measuring apparatus of the first embodiment can further improve the measuring accuracy.

Therefore, because the measurement control section 21 does not have to output the output designation of each measuring wavelength λ or the measuring designation of the signal e to each measuring wavelength each time, it is possible to improve the measurement efficiency of the whole wavelength characteristic of the wavelength characteristic measuring apparatus to the measuring object 2.

(Second Embodiment)

Figure 7:
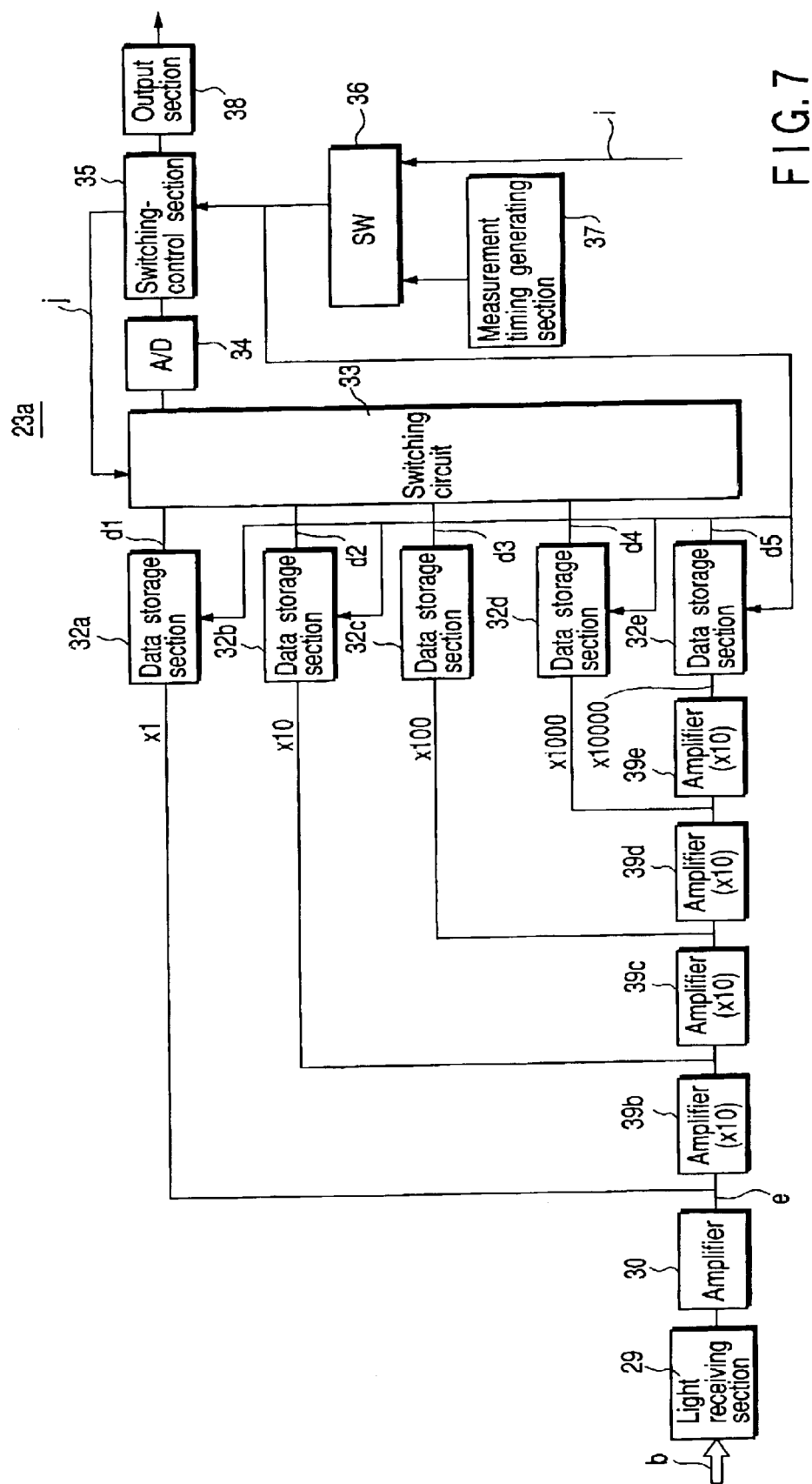
FIG. 7 is a block diagram showing a schematic configuration of an optical power meter built in a wavelength characteristic measuring apparatus according to a second embodiment of the present invention.

FIG. 7 is a block diagram showing a schematic configuration of the optical power meter 23a built in the wavelength characteristic measuring apparatus of the second embodiment.

In FIG. 7, the parts the same as those of the optical power meter 23 built in the wavelength characteristic measuring apparatus of the first embodiment shown in FIG. 4 have the same symbols and detailed description of those parts is thus omitted.

A wavelength variable light source 22 and measurement control section 21 other than an optical power meter 23a are the same as those of the wavelength characteristic measuring apparatus of the first embodiment shown in FIG. 1.

That is, as shown in FIG. 7, a plurality of amplifiers 39b, 39c, 39d, and 39e having the same amplification factor α (=10) and connected in series are built in the optical power meter 23 instead of the amplifiers 31a, 31b, 31c, 31d, and 31e having amplification factors α different from each other and connected in parallel of the optical power meter 23 in FIG. 4.

In the case of the optical power meter 23a having the above configuration, light b emitted from a measuring object 2 enters a light receiving section 29 in the optical power meter 23a and is converted into electrical signals corresponding to light intensity.

The electrical signal is amplified up to a predetermined level by a preamplifier 30 and then, input to the amplifiers 39b, 39c, 39d, and 39e connected in series in order as a new signal e.

Output signals of the amplifiers 39b, 39c, 39d, and 39e and the preamplifier 30 are input to data storage sections 32a, 32b, 32c, 32d, and 32e.

Because the amplifiers 30, 39b, 39c, 39d, and 39e are connected in series, a signal having a level equal to a reference level A is applied to the data storage section 32a when assuming the level of the output signal e of the preamplifier 30 as the reference level A.

A signal obtained by amplifying the reference level A up to 10 times is applied to the data storage section 32b.

A signal obtained by amplifying the reference level A up to 100 times is applied to the data storage section 32c.

A signal obtained by amplifying the reference level A up to 1,000 times is applied to the data storage section 32d.

A signal obtained by amplifying the reference level A up to 10,000 times is applied to the data storage section 32e.

Therefore, signal values $d_1$, $d_2$, $d_3$, $d_4$, and $d_5$ stored in the data storage sections 32a, 32b, 32c, 32d, and 32e synchronously with each timing signal i become equal to the signal values $d_1$, $d_2$, $d_3$, $d_4$, and $d_5$ of the data storage sections 32a, 32b, 32c, 32d, and 32e in which the amplifiers 31a, 31b, ..., and 31e of the optical power meter shown in FIG. 4 are connected in parallel.

Accordingly, the optical power meter 23a shown in FIG. 7 selects an optimum signal value out of the signal values $d_1$, $d_2$, $d_3$, $d_4$, and $d_5$ and coverts them in accordance with the amplification factor α the same as the case of the optical power meter 23 shown in FIG. 4.

Then, the measured values $D_1$, $D_2$, $D_3$, ..., and $D_N$ of the measuring wavelengths $\lambda_1$, $\lambda_2$, $\lambda_3$, ..., and $\lambda_N$ are transmitted to the measurement control section 21 synchronously with each timing signal i.

Therefore, according to the wavelength characteristic measuring apparatus of the second embodiment, it is possible to obtain almost the same operation/working-effect as the wavelength characteristic measuring apparatus of the first embodiment.

Moreover, in the case of the wavelength characteristic measuring apparatus of the second embodiment, it is possible to reduce the whole cost of the apparatus because of using the amplifiers 39a, 39b, ..., and 39e according to the same specification.

(Third Embodiment)

FIG. 8 is a block diagram showing a schematic configuration of an optical power meter 23b built in the wavelength characteristic measuring apparatus of the third embodiment of the present invention.

In FIG. 8, the same portion as that of the optical power meter 23 built in the wavelength characteristic measuring apparatus of the first embodiment shown in FIG. 4 is provided with the same symbol and detailed description of a duplicate portion is omitted.

A wavelength variable light source 22 and measurement control section 21 other than the optical power meter 23b are the same as those of the wavelength characteristic measuring apparatus of the first embodiment shown in FIG. 1.

That is, as shown in FIG. 8, a plurality of amplifiers 40b, 40c, 40d, and 31e connected in series and having the same amplification factor α (=10) are built in the optical power meter 23b instead of the amplifiers 31a, 31b, 31c, 31d, and 31e of the optical power meter 23 in FIG. 4 connected in parallel and having amplification factors α different from each other.

In the case of the optical power meter 23b having the above configuration, light b emitted from a measuring object 2 enters a light receiving section 29 in the optical power meter 23b and is converted into an electrical signal corresponding to light intensity.

The electrical signal is amplified up to a predetermined level by a preamplifier 30 having a predetermined amplification factor (assumed as α=1 for convenience' sake) and then input to the amplifiers 40b, 40c, 40d, and 40e in order as a new signal e.

Here, signals output from the preamplifier 30 and amplifiers 40b, 40c, 40d, and 40e are transmitted to a plurality of comparators 41a, 41b, 41c, 41d, and 41e and a data storing/switching circuit section 33 to be described later as signals of ×1, ×10, ×100, ×1,000, and ×10,000 respectively.

The comparators 41a, 41b, 41c, 41d, and 41e respectively compare signals output from the amplifiers 30, 40b, 40c, 40d, and 40e in accordance with upper limit value and lower limit value in a preset measuring range corresponding to each amplifier and thereby respectively output a switching signal showing connection when a signal output from each of the above amplifiers is kept between the upper limit value and lower limit value and output a switching signal showing no-connection to the data-holding/switching circuit section 33 and a switching-control section 35 when a signal output from each of the above amplifiers is out of the upper and lower limit values.

Thereby, the switching-control section 35 can determine a signal output from which amplifier of the amplifiers 30, 40b, 40c, 40d, and 40e is selected as described later.

Then, the data storing/switching circuit section 33 stores a signal output from a corresponding amplifier among the amplifiers 30, 40b, 40c, 40d, and 40e decided by switching signals output from the comparators 41a, 41b, 41c, 41d, and 41e in accordance with a plurality of timing information output from the timing information outputting means while the light having a wavelength delimited by the above predetermined step is emitted and outputs the signal to an analog/digital (A/D)-converting section 34.

In this case, the A/D-converting section 34 converts one analog signal present in the above desired measuring range switching-controlled by the data storing/switching circuit section 33 to a digital signal and outputs the digital signal to the switching-control section 35.

Then, the switching-control section 35 selects a signal output from a corresponding amplifier among the amplifiers 30, 40b, 40c, 40d, and 40e decided in accordance with the switching signal out of the signals stored in the data storing/switching circuit section 33 as one signal in a desired measuring range through the A/D-converting section 34 in accordance with a switching signal output from the comparator 41a, 41b, 41c, 41d, or 41e.

That is, the switching-control section 35 confirms the above data-storing-timing signal and then, receives the data converted into digital signals from the A/D-converting section 34.

Moreover, the switching-control section 35 determines which amplifier is selected in accordance with the above switching signal as described when confirming the above data-storing-timing signal.

Then, the switching-control section 35 converts the data received from the A/D-converting section 34 in accordance with the amplification factor of any one of signals of ×1, ×10, ×100, ×1,000, and ×10,000 output from a selected amplifier and outputs the data to the output section 38.

As described above, in the case of a wavelength characteristic measuring apparatus and method of the present invention, the timing information synchronous with wavelength change of the light output from a wavelength variable light source is adopted to specify a signal value at a measuring wavelength.

Moreover, in the case of a wavelength characteristic measuring apparatus and method of the present invention, a plurality of amplifiers are adopted to obtain signal values simultaneously amplified at a plurality of amplification factors.

Therefore, a wavelength characteristic measuring apparatus and method of the present invention make it possible to improve a measuring accuracy while keeping a wide measuring dynamic range for a measuring object and moreover efficiently measure a wavelength characteristic.

Thus, according to the present invention, it is possible to provide a wavelength characteristic measuring apparatus and method capable of efficiently measuring a wavelength characteristic while keeping a wide measuring dynamic range for a measuring object by adopting the timing information synchronous with the change of the light output from a wavelength variable light source to a predetermined measuring wavelength and adopting a plurality of amplifiers.

What is claimed is:

1. A wavelength characteristic measuring apparatus comprising:
    a wavelength variable light source which emits a light whose wavelengths continuously change from a preset start wavelength up to a stop wavelength to a measuring object;
    timing information outputting means for generating a plurality of timing information showing emission timings of lights to be emitted from the wavelength variable light source and having start and stop wavelengths and a plurality of wavelengths obtained by delimiting the wavelengths between the start and stop wavelengths by predetermined steps;
    a light receiving section which receives a light output from the measuring object and outputs a signal showing a measured value of a received light;
    a plurality of amplifiers which receive the signal output from the light receiving section and amplify the signal at each predetermined amplification factor; and
    a signal selecting section which selects one signal kept in a predetermined measuring range of signals amplified at the each predetermined amplification factor by said plurality of amplifiers and outputs the signal as the measured value of the light having a wavelength which is decided in accordance with corresponding timing information among said plurality of timing information output from the timing information outputting means.

2. The wavelength characteristic measuring apparatus according to claim 1, wherein the signal selecting section comprises:
    a plurality of data storage sections which respectively store the signals amplified at each the predetermined amplification factor by said plurality of amplifiers in accordance with said plurality of timing information output from the timing information outputting means while the lights having the wavelengths delimited by the predetermined steps are emitted, and
    a control section which selects the one signal kept in a desired measuring range of signals stored in said plurality of data storage sections.

3. The wavelength characteristic measuring apparatus according to claim 1, wherein
    the timing information outputting means is built in the wavelength variable light source.

4. The wavelength characteristic measuring apparatus according to claim 1, wherein
    said plurality of amplifiers are connected in parallel and have amplification factors different from each other.

5. The wavelength characteristic measuring apparatus according to claim 1, wherein
    said plurality of amplifiers are connected in series and have the same amplification factor each other.

6. The wavelength characteristic measuring apparatus according to claim 1, wherein the signal selecting section comprises:
    a plurality of data storage sections which store signals amplified at the each predetermined amplification factor by said plurality of amplifiers in accordance with a plurality of timing information output from the timing information outputting means while lights having wavelengths delimited by the predetermined steps are emitted;
    a switching circuit which successively switches and outputs signals stored in said plurality of data storage sections; and
    a switching-control section which switching-controls the switching circuit and selects the one signal kept in a desired measuring range within a data storage period of said plurality of data storage section.

7. The wavelength characteristic measuring apparatus according to claim 6, wherein the signal selecting section comprises:
    an analog/digital converting section set between the switching circuit and the switching-control section, the analog/digital converting section converting one analog signal in the desired measuring range switching-controlled by the switching circuit into a digital signal; and
    an output section which outputs the signal in the desired measuring range converted into the digital signal by the analog/digital converting section to an external unit through the switching-control section.

8. The wavelength characteristic measuring apparatus according to claim 1, wherein the wavelength variable light source comprises:

a semiconductor laser;

a diffraction grating into which a light having many wavelengths λ distributed in a predetermined wavelength region and output from one face of the semiconductor laser is applied and which diffracts the light into a plurality of lights having wavelengths different from each other;

a reflecting mirror which forms an external resonator with an optical path formed by reflecting a light having a specific wavelength among the lights diffracted by the diffraction grating, guides the light having the specific wavelength into the diffraction grating again, and returns the light to the semiconductor laser;

an arm which rotatably supports the reflecting mirror on a fixed shaft;

a motor which rotates the arm;

a motor driving circuit which controls the rotation of the motor;

a wavelength control section which writes a start wavelength, a stop wavelength, and N measuring wavelengths $\lambda_1, \lambda_2, \ldots,$ and $\lambda_N$ included in wavelength setting information g in a wavelength memory, reading the start and stop wavelengths stored in the wavelength memory when a start command h is input, designating the start and stop wavelengths, and starting the motor driving circuit;

a wavelength detecting circuit which monitors a wavelength λ of a light "a" emitted from the wavelength variable light source based on a rotation angle position of the motor; and a timing signal generating section which outputs N pulsatile timing signals while the wavelength λ of the light "a" emitted from the wavelength variable light source changes from a start wavelength up to a stop wavelength based on the monitoring result by the wavelength detecting circuit whenever reaching the measuring wavelengths $\lambda_1, \lambda_2, \ldots,$ and $\lambda_N$ stored in the wavelength memory.

9. A wavelength characteristic measuring method comprising:

emitting a light whose wavelengths continuously change from a preset start wavelength up to stop wavelength from a wavelength variable light source to a measuring object by a wavelength variable light source;

generating a plurality of timing information showing emission timings of lights emitted from the wavelength variable light source and having start and stop wavelengths and a plurality of wavelengths obtained by delimiting the wavelengths between the start and stop wavelengths in predetermined steps by timing information outputting means;

receiving a light output from the measuring object and outputting a signal showing a measured value of a received light by a light receiving section;

receiving the signal output from the light receiving section and amplifying the signal at each predetermined amplification factor by a plurality of amplifiers; and selecting one signal kept in a predetermined measuring range of signals amplified at the each predetermined amplification factor by said plurality of amplifiers and outputting the one signal as a measured value of the light having a wavelength decided in accordance with corresponding timing information in said plurality of timing information output from the timing information outputting means, by a signal selecting section.

10. The wavelength characteristic measuring method according to claim 9, wherein signal selection by the signal selecting section comprises:

storing the signals amplified at the each predetermined amplification factor by said plurality of amplifiers in accordance with a plurality of timing information output from the timing information outputting means while lights having wavelengths delimited by the predetermined steps in a plurality of data storage sections, and selecting the one signal kept in a desired measuring range of signals stored in said plurality of data storage sections by a control section.

11. The wavelength characteristic measuring method according to claim 9, wherein signal selection by the signal selecting section comprises:

storing the signals amplified at the each predetermined amplification factor by said plurality of amplifiers in accordance with a plurality of timing information output from the timing information outputting means while lights having wavelengths delimited by the predetermined steps are emitted in a plurality of data storage sections;

successively switching and outputting signals stored in said plurality of data storage sections by a switching circuit; and switching-controlling the switching circuit in a data storage period of said each data storage section and selecting one signal in a desired measuring range by a switching-control section.

12. The wavelength characteristic measuring method according to claim 10, further comprising:

outputting one timing signal from the wavelength variable light source;

reading a signal value of said one data storage section corresponding to one amplifier finally switching-connected out of said plurality of amplifiers by specifying the switching circuit;

determining that the read signal value is not lower than the measuring range and that the read signal value is not higher than the measuring range, and thereby determining the signal value is present in the measuring range;

dividing the read signal value by an amplification factor α of the amplifier outputting the signal value and converting the division value into a measured value of a corresponding signal; and transmitting the converted measured value to the output section as a measured value of the measuring wavelength decided in accordance with the output sequence of timing signals.

13. The wavelength characteristic measuring method according to claim 11, further comprising:

when the read signal value is lower than the measuring range, confirming that the amplification factor of the amplifier outputting the signal value is not equal to the maximum amplification factor and transmitting a switching-connecting command to a data storage section corresponding to an amplifier having one-stage-higher amplification factor to the switching circuit;

reading the switched signal value and when the amplification factor of the amplifier outputting the signal value is already equal to the maximum amplification factor, directly adopting the signal value and converting a corresponding signal into a measured value; and transmitting the converted measured value to the output section as a measured value of a corresponding wavelength decided in accordance with the output sequence of timing signals.

14. The wavelength characteristic measuring method according to claim 12, further comprising:

when the read signal value is higher than the measuring range, confirming that the amplification factor of the amplifier outputting the signal value is not equal to the minimum amplification factor and transmitting a switching-connecting command to a data storage section corresponding to an amplifier having one-stage-lower amplification factor to the switching circuit;

reading a switched signal value and when the amplification factor of the amplifier outputting the signal value is already equal to the minimum amplification factor, directly adopting the signal value and converting a corresponding signal into a measured value; and transmitting the converted measured value to the output section as a measured value to a corresponding wavelength decided in accordance with the output sequence of timing signals.

15. A wavelength characteristic measuring apparatus comprising:

a wavelength variable light source which emits a light whose wavelengths continuously change from a start wavelength up to a stop wavelength to a measuring object;

timing information outputting means for generating timing information showing emission timings of lights emitted from the wavelength variable light source and having start and stop wavelengths and a plurality of wavelengths obtained by delimiting the wavelengths between the start and stop wavelengths in predetermined steps;

a light receiving section which receives a light emitted from the measuring object and outputs a signal showing a measured value of the received light;

a plurality of amplifiers which receive signals from the light receiving section and amplify the signals at each predetermined amplification factor;

a plurality of comparators which compares the signals amplified at each predetermined amplification factor by said plurality of amplifiers in accordance with an upper limit value and a lower limit value of a measuring range corresponding to each preset amplifier, and thereby outputting a switching signal showing connection when the signal output from said each amplifier is kept between the upper limit value and the lower limit value and outputting a switching signal showing non-connection when the signal output from said each amplifier is not kept between the upper limit value and the lower limit value;

a data storing/switching circuit section which stores signals output from a corresponding amplifier among a plurality of amplifiers decided based on switching signals output from said plurality of comparators in accordance with timing information output from the timing information outputting means while the light having wavelengths delimited by the predetermined steps is emitted; and a control section which selects a signal output from a corresponding amplifier out of a plurality of amplifiers decided in accordance with the switching signals among the signals stored in the data storing/switching circuit section as one signal in a desired measuring range based on the switching signal from said plurality of comparators.

16. The wavelength characteristic measuring apparatus according to claim 15, wherein the timing information outputting means is built in the wavelength variable light source.

17. The wavelength characteristic measuring apparatus according to claim 15, further comprising:

an analog/digital converting section set between the data storing/switching circuit section and the control section, the analog/digital converting section converting one analog signal in the desired measuring range switching-controlled by the data storing/switching circuit section into a digital signal; and an output section which outputs one signal converted into a digital signal by the analog/digital converting section and in the desired measuring range to an external unit through the control section.

18. The wavelength characteristic measuring apparatus according to claim 15, wherein the wavelength variable light source comprises:

a semiconductor laser;

a diffraction grating in which a light having many wavelengths $\lambda$ distributed in a predetermined wavelength region output from one face of the semiconductor laser enters and which divides the light into a plurality of lights having wavelengths different from each other;

a reflecting mirror which reflects a light having a specific wavelength among the lights divided by the diffraction grating, guides the light into the diffraction grating again, and returns the light to the semiconductor laser, and thereby forming an external resonator in accordance with the optical path;

an arm which rotatably supports the reflecting mirror on a fixed shaft;

a motor which rotates the arm;

a motor driving circuit which controls the rotation of the motor;

a wavelength control section which writes a start wavelength and a stop wavelength and N measuring wavelengths $\lambda_1, \lambda_2, \ldots,$ and $\lambda_N$ included in wavelength setting information g in a wavelength memory and when a start command h is input, reading the start wavelength and stop wavelength stored in the wavelength memory, designating the start wavelength and stop wavelength, and starting the motor driving circuit;

a wavelength detecting circuit which monitors a wavelength $\lambda$ of a light "a" emitted from the wavelength variable light source in accordance with a rotation angle position of the motor; and a timing signal generating section which outputs N pulsatile timing signals while the wavelength $\lambda$ of the light "a" emitted from the wavelength variable light source changes from a start wavelength to a stop wavelength in accordance with a monitoring result by the wavelength detecting circuit whenever reaching the measuring wavelengths $\lambda_1, \lambda_2, \ldots,$ and $\lambda_N$ stored in the wavelength memory.

19. A wavelength characteristic measuring method comprising:

emitting a light whose wavelengths continuously change from a preset start wavelength up to a stop wavelength from a wavelength variable light source to a measuring object;

generating timing information showing emission timings of lights emitted from the wavelength variable light source and having start and stop wavelengths and a plurality of wavelengths obtained by delimitating the wavelengths between the start and stop wavelengths in predetermined steps by timing information outputting means;

receiving a light emitted from the measuring object and outputting a signal showing a measured value of the received light by a light receiving section;

receiving signals output from the light receiving section and amplifying the signals at each predetermined amplification factor by a plurality of amplifiers;

comparing the signals amplified by the amplifiers at each predetermined amplification factor in accordance with an upper limit value and a lower limit value in a desired measuring range corresponding to each preset amplifier by the comparators and thereby, outputting a switching signal showing connection when a signal output from said each amplifier is kept between the upper limit value and the lower limit value and outputting a switching signal showing no-connection when the signal output from said each amplifier is not kept between the upper limit value and the lower limit value by a plurality of comparators;

storing signals output from a corresponding amplifier among a plurality of amplifiers decided in accordance with switching signals output from said plurality of comparators in accordance with timing information output from the timing information outputting means while the light having wavelengths delimited by the predetermined steps by a data storing/switching circuit; and selecting a signal output from a corresponding amplifier among a plurality of amplifiers decided in accordance with the switching signals among the signals stored in the data storing/switching circuit section as one signal in a desired measuring range based on the switching signal from said plurality of comparators.

* * * * *